UNITED STATES PATENT OFFICE.

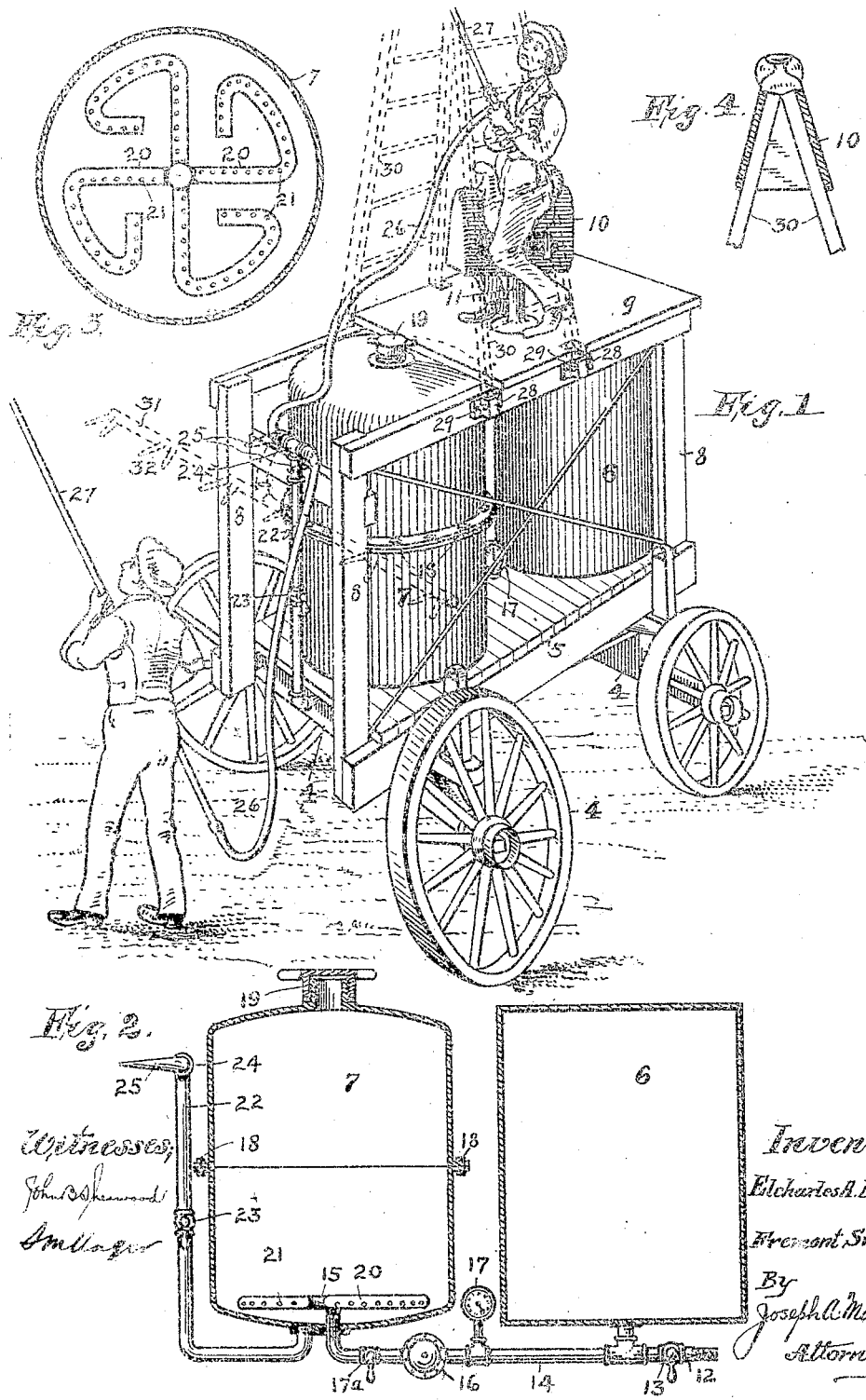

ELCHARLES ARTHUR DE VORE AND FREMONT SWAIN, OF INDIANAPOLIS, INDIANA.

SPRAYER.

No. 835,408.  Specification of Letters Patent.  Patented Nov. 6, 1906.

Application filed March 2, 1904. Serial No. 196,212.

*To all whom it may concern:*

Be it known that we, ELCHARLES ARTHUR DE VORE and FREMONT SWAIN, citizens of the United States, residing at Indianapolis, in the county of Marion and State of Indiana, have invented certain new and useful Improvements in Sprayers, of which the following is a specification.

This invention relates to improvements in means for applying poisons to kill insects, their eggs and larvæ, and all other parasites that live upon and are injurious to plant life.

The object of the invention is to provide a more thorough means by which to apply the necessary poison in a less laborious and costly manner and to provide means whereby the spraying of orchards and fields may be carried on profitably as a business. The poison in liquid solution or suspension is expelled by air compressed in a suitable holder by the aid of a pump and motor. The steam-engine commonly used by threshermen is well adapted for furnishing the pumping power, and the business of spraying, coming, as it does, in the spring and early summer, is a good supplement to the thresherman's vocation. With threshing through the late summer and fall, corn-shredding in late fall and winter, and spraying in spring and summer the threshermen's time will be well filled. The adoption by him of the business which this invention makes practical will be beneficial to himself and to his community.

We accomplish the objects of this invention by the mechanism illustrated in the accompanying drawings, in which—

Figure 1 is a perspective view of a wagon equipped with our spraying apparatus; Fig. 2, a detail of the tanks for liquid and compressed air in vertical central section; and Fig. 3, a horizontal section of the tank for containing the liquid solution, showing the mixer-tubes in under side plan view. Fig. 4 is a vertical section of the hollow horse mounted on the ends of the two ladders.

Like characters of reference indicate like parts throughout the several views of the drawings.

4 represents the running-gears of an ordinary farm-wagon, and 5 a platform, which occupies the usual place of the wagon-bed. Located on the platform is the tank 6 at the front of the wagon to contain compressed air and the tank 7 at the rear, which will contain the liquid to be sprayed. As the wagon, with the tanks, will be drawn through the orchard or field to be sprayed over uneven ground it is necessary to secure the tanks immovable on the platform in order to prevent leakage in their pipe connections. A suitable frame is therefore required, such as is shown at 8. This frame will support the platform 9, on which an operator to direct the spraying in the top branches of trees will be located. This platform will preferably have a seat for the comfort of the operator, (here shown as a saddle mounted on a horse 10,) which is supported by a standard 11. The horse will preferably have rotary adjustment on the standard to enable the operator to turn readily in his work.

The tank 6 will be of metal capable of resisting a pressure of several hundred pounds to the square inch. It will be filled through the pipe 12, which will be removably connected with any suitable air-compressor, such as an air-pump. (Not shown.) The pipe 12 has a valve or cock 13 for opening, closing, and regulating the flow of air through it. Taking from the bottom of tank 6 is the pipe 14, which enters the bottom of the tank 7 and terminates at the bottom of the latter in the mixer 15. This pipe 14 has the automatic regulator 16, the pressure-indicator 17, and valve 17ª.

The tank 7 will contain the liquid preparation to be sprayed, such as the Bordeaux mixture (of sulfate of copper and lime) and arsenic, which is most commonly used for orchards, or any other mixture that the work in hand may require. The tank will in consequence be of copper or other material that will withstand the corrosive action of the chemicals, and for economical construction and easy access for cleaning and repairs we prefer to make it in two transversely-divided halves each of which will have marginal flanges which are united by bolts 18. The top of the tank will have a hand-hole surrounded by a threaded flange, on which is screwed the cap 19, which is removed by unscrewing when it is desired to charge the tank with the fluid.

The presence of the sulfate of copper and lime in the mixture tends to produce a coagulation that interferes with the spraying and its efficiency. This can only be dissipated by a constant agitation which is secured by the action of the compressed air issuing through the mixer 15. This mixer, as shown in Fig. 3, comprises a plurality of radial arms (here shown as four in number) which merge at their outer ends into curved portions. The arms and curved members 20 are hollow with closed ends and have small under side perforations 21 for the escape of the air under pressure. The perforations in the curved members are pointed directly downward; but those in the radial arms are alined at one side of the vertical center and on the same side in each arm, whereby a movement or swirl of the liquid will be produced. This movement will churn and agitate the liquid against the arms, and the downward jets from the curved members will stir up such matter as may tend to settle in the bottom of the tank.

Leading from the bottom of tank 7 is the discharge-pipe 22, having the cut-off valve 23, by which the flow of liquid through the pipe can be regulated. This pipe terminates with the T-head 24, with threaded ends for the attachment of spraying-nozzles 25, as shown in Fig. 2 and by dotted lines in Fig. 1, where the spraying of low-lying bushes and plants is to be done or to which the lines of hose 26 26 may be attached and the hose connected with the well-known extension tubes 27, which have terminal nozzles for the spraying of trees and shrubs requiring a high reach to properly deliver the spray.

Our invention is applicable to spraying orchards of every description, vines, bushes, and wheat-fields, to destroy rust, and the various pests that jeopardize the crops.

In practice a charging-station will be established by locating a threshing-engine and pumps convenient to water and as near central as possible. The wagons, with their spraying outfits, will go to the station to be charged with compressed air and spraying fluid. From there they will be hauled to places where the spraying is to be done, and as the tanks are emptied the wagons will return them for recharging.

For spraying in the limbs of high trees which are out of the reach of the operator on the top platform we provide the two ladders 30, the legs of which are supported by insertion in sockets 28, where they are retained by bolts 29 or other secure means, and being inclined toward each meet at their upper ends, have the latter united by any suitable means. In the drawings we have shown the upper ends united by dropping the hollow horse 10 down over the ends of the ladder, as shown in Fig. 4. It is important that the ladders be very securely fastened to the supporting-body in order to prevent accident to the man who works from the top of them and who will be there while the spraying-machine is drawn from place to place, as from one tree to another or to different sides of the same tree. It is also desirable to make him as comfortable as possible in his arduous labor and to make him feel as secure as possible by providing a device that he can hold onto readily. For the above reasons we make the horse 10 hollow on the inside and open at the bottom, and as it is not needed on the platform 9 while the operator is at work on the ladders we remove it, with its saddle, from standard 11 and place it over the ends of the ladders.

It is desirable to carry as high pressure of air in tank 6 as can be practically stored and retained, and a pressure so great as to be disastrous to the liquid-tank, if admitted to the latter with full force, and in order to prevent accidents, due to ignorance or carelessness, by turning on the full pressure, we provide the automatic regulator 16 in the pipe connecting the two tanks. This is of any of the well-known reducers of which there are several good ones on the market. As it is impracticable to pump air from the atmosphere into a tank and get a pressure much over two hundred pounds to the square inch, and as we may want more than that in the tank that goes to the orchard, we will in such cases pump first into another tank and then pump from that tank into the one on the machine. This is a novel expedient and an important one in our business.

Having thus fully described our invention, what we claim as new, and desire to secure by Letters Patent, is—

1. A spraying outfit having an elevated platform, ladders extended above the platform, and a seat on a hollow horse secured to the platform and adapted to be removed therefrom and placed upon the ladders with the ends of the ladders entering the hollow of the horse.

2. In a spraying outfit a pair of vertically-extended rectangular frames, sockets on the horizontal top members of said frame, extension ladders having legs seated in said socket and means for securing them therein and a hollow horse adapted to receive the top ends of the ladders.

3 In a spraying device, the combination of a tank containing a liquid to be sprayed, a spraying-nozzle connected with said tank, a second tank containing the air under pressure, a conduit connecting the two tanks, and a mixer at the bottom of the liquid-holding tank at the discharge end of said conduit, said mixer comprising a plurality of stationary radial tubular arms closed at their outer ends, said arms having perforations on lines between planes passing vertically and horizontally through said arms on the same relative under side of each arm.

4. In a spraying device, the combination of a tank containing a liquid to be sprayed, a spraying-nozzle connected with said tank, a second tank containing air under pressure, a pipe connecting the two tanks and a mixer at the bottom of the liquid-holding tank at the discharge end of said pipe, said mixer comprising a plurality of stationary radial tubular arms with under side perforations on the same relative side of each arm between the middle and bottom of the arm, said arms merging at their outer ends into curved portions which are closed at their outer ends and are provided with vertical downward perforations.

In witness whereof we have hereunto set our hands and seals, at Indianapolis, Indiana, this 26th day of February, A. D. 1904.

ELCHARLES ARTHUR DE VORE. [L. S.]
FREMONT SWAIN. [L. S.]

Witnesses:
JOHN D. SHERWOOD,
JOSEPH A. MINTURN.